US012128918B2

(12) United States Patent
Shimizu

(10) Patent No.: US 12,128,918 B2
(45) Date of Patent: Oct. 29, 2024

(54) IN-VEHICLE SENSOR CLEANING SYSTEM, METHOD, AND STORAGE MEDIUM

(71) Applicant: TOYOTA JIDOSHA KABUSHIKI KAISHA, Toyota (JP)

(72) Inventor: Ryusuke Shimizu, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 80 days.

(21) Appl. No.: 18/150,252

(22) Filed: Jan. 5, 2023

(65) Prior Publication Data

US 2023/0278577 A1 Sep. 7, 2023

(30) Foreign Application Priority Data

Mar. 3, 2022 (JP) ................. 2022-032985

(51) Int. Cl.
*B60W 50/14* (2020.01)
*B60S 1/56* (2006.01)
*B60W 50/00* (2006.01)

(52) U.S. Cl.
CPC ............... *B60W 50/14* (2013.01); *B60S 1/56* (2013.01); *B60W 2050/0083* (2013.01); *B60W 2050/143* (2013.01); *B60W 2050/146* (2013.01); *B60W 2420/403* (2013.01); *B60W 2540/043* (2020.02); *B60W 2556/10* (2020.02)

(58) Field of Classification Search
None
See application file for complete search history.

(56) References Cited

U.S. PATENT DOCUMENTS

| 11,945,415 | B2* | 4/2024 | Hayashi | B08B 13/00 |
| 2019/0111941 | A1 | 4/2019 | Hori et al. | |
| 2021/0009088 | A1* | 1/2021 | Hayashi | B08B 3/02 |
| 2021/0229639 | A1 | 7/2021 | Sato | |
| 2021/0362200 | A1* | 11/2021 | Dingli | B08B 13/00 |
| 2021/0370885 | A1* | 12/2021 | Dingli | B08B 5/02 |
| 2022/0153235 | A1* | 5/2022 | Sato | G06V 20/56 |
| 2023/0182742 | A1* | 6/2023 | Han | B60W 40/02 701/23 |
| 2024/0101070 | A1* | 3/2024 | Inoue | B60S 1/52 |

FOREIGN PATENT DOCUMENTS

| CN | 111918800 A | * 11/2020 | ............ B08B 13/00 |
| JP | 2019074803 A | 5/2019 | |
| JP | 2020067728 A | 4/2020 | |
| JP | 2021115929 A | 8/2021 | |
| WO | WO-2019022038 A1 | * 1/2019 | ............... B60S 1/46 |

* cited by examiner

*Primary Examiner* — Fekadeselassie Girma
(74) *Attorney, Agent, or Firm* — Dickinson Wright, PLLC

(57) ABSTRACT

An in-vehicle sensor cleaning system installed in a vehicle includes: a cleaning unit configured to automatically or manually perform cleaning of an in-vehicle sensor installed in the vehicle; a setting unit configured to set an automatic cleaning function to on and off, the automatic cleaning function causing the cleaning unit to automatically perform the cleaning of the in-vehicle sensor; and a notification unit configured to provide a notification about switching a setting of the automatic cleaning function, based on information on past cleaning of the in-vehicle sensor, when the automatic cleaning function is set to off by the setting unit.

15 Claims, 4 Drawing Sheets

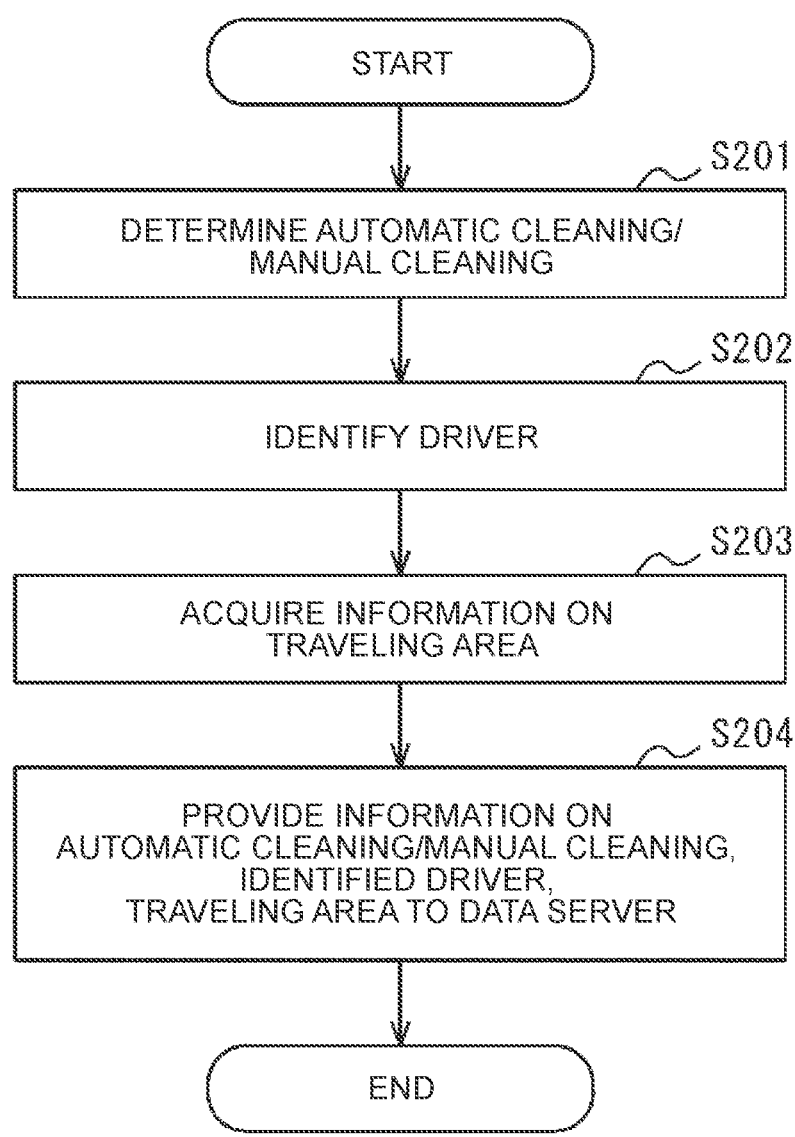

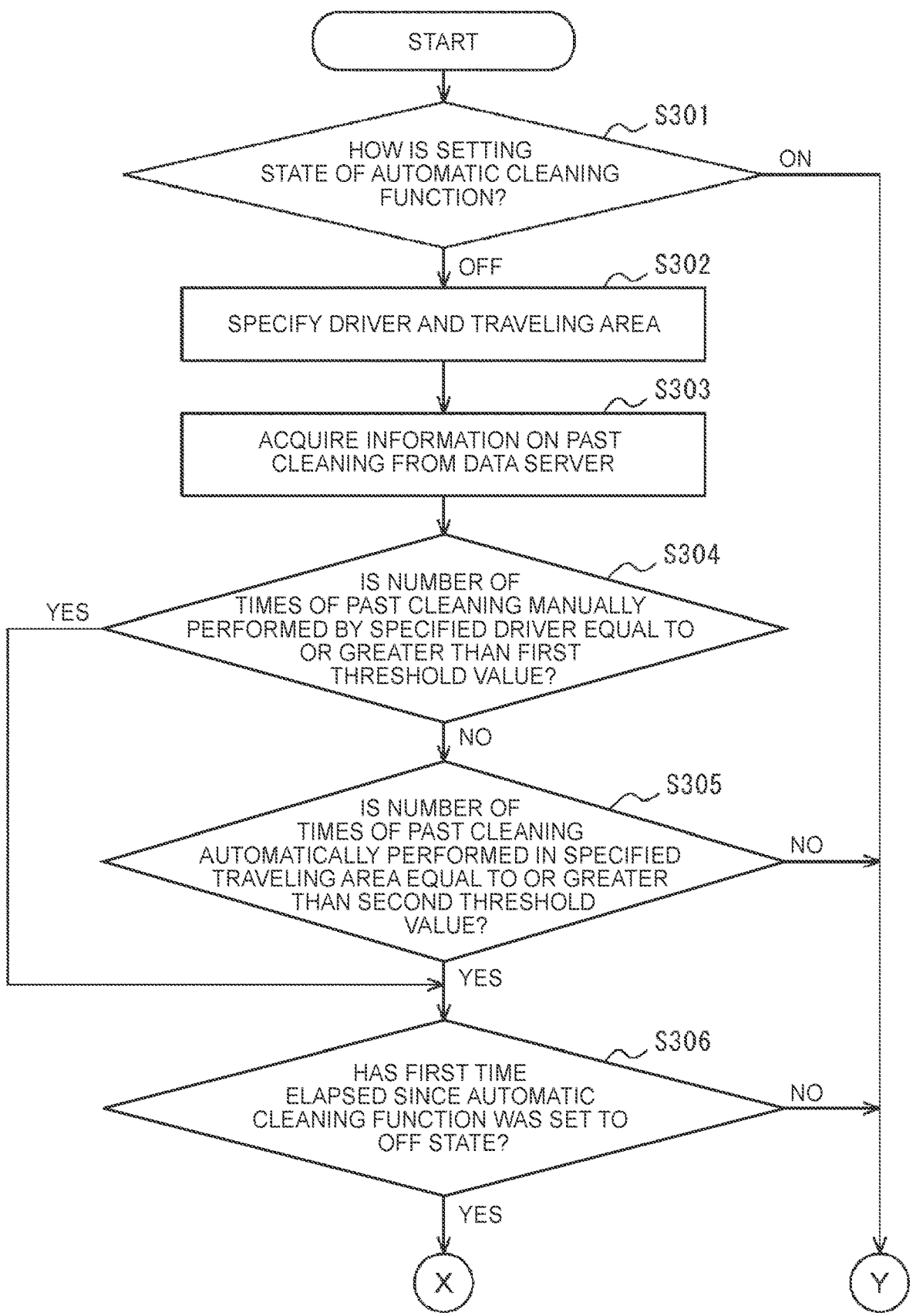

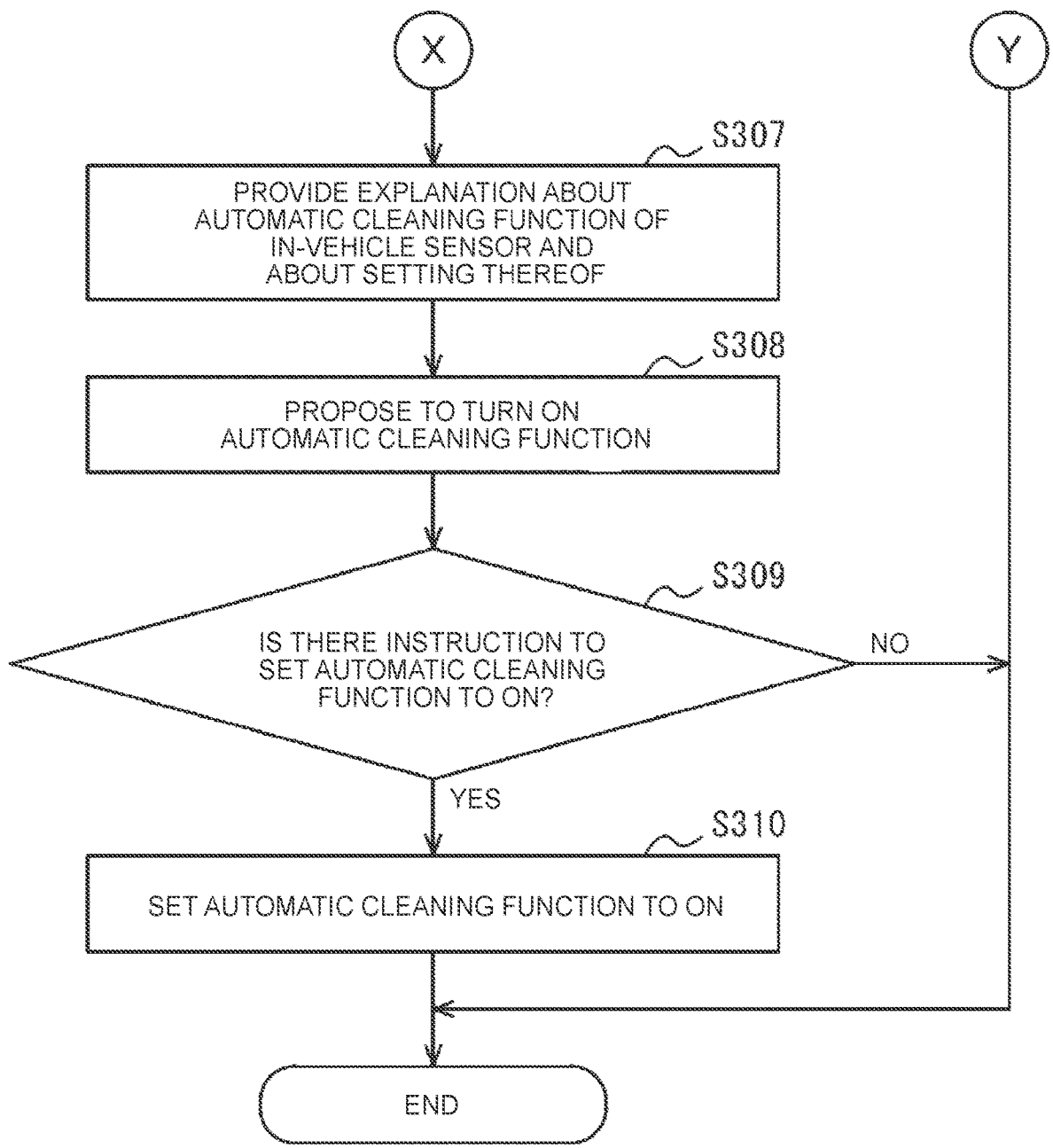

IN-VEHICLE SENSOR CLEANING SYSTEM, METHOD, AND STORAGE MEDIUM

CROSS-REFERENCE TO RELATED APPLICATION

This application claims priority to Japanese Patent Application No. 2022-032985 filed on Mar. 3, 2022 incorporated herein by reference in its entirety.

BACKGROUND

1. Technical Field

The present disclosure relates to an in-vehicle sensor cleaning system and the like for cleaning sensors, cameras, etc. (hereinafter collectively referred to as "in-vehicle sensors") installed in vehicles.

2. Description of Related Art

When performing vehicle traveling control such as advanced driver assistance system (ADAS) and autonomous driving (AD), it is essential to maintain, with high accuracy, detecting/sensing performance by in-vehicle sensors that acquire information used for control.

Japanese Unexamined Patent Application Publication No. 2021-115929 (JP 2021-115929 A) discloses an in-vehicle sensor cleaning device with a function to automatically clean a detector of an in-vehicle sensor with a cleaning solution. This in-vehicle sensor cleaning device ensures high detection accuracy of the in-vehicle sensor by cleaning the detector when an automatic cleaning condition such as dirt on the detector is satisfied.

SUMMARY

There are vehicles in which an operation of an in-vehicle sensor cleaning system is able to be customized, for example, an automatic cleaning function of an in-vehicle sensor is able to be set to on/off. In such a vehicle, when an owner of the vehicle, a user such as a driver and a passenger, and the like (hereinafter collectively referred to as a "vehicle user") are not aware that the operation of the in-vehicle sensor cleaning system is able to be customized, it cannot be expected that, when the automatic cleaning function is set to off, the vehicle user switches the automatic cleaning function from the off state to an on-setting by the vehicle user's voluntary operation. Therefore, the performance of detecting/sensing by the in-vehicle sensor may not be maintained with high accuracy due to dirt and the like on the in-vehicle sensor.

The present disclosure has been made in view of the above issues, and an object of the present disclosure is to provide an in-vehicle sensor cleaning system and the like that provide a notification about switching a setting of the automatic cleaning function when the automatic cleaning function of the in-vehicle sensor is set to off.

In order to solve the above issues, an aspect of the present disclosure technology relates to an in-vehicle sensor cleaning system installed in a vehicle. The in-vehicle sensor cleaning system includes: a cleaning unit configured to automatically or manually perform cleaning of an in-vehicle sensor installed in the vehicle; a setting unit configured to set an automatic cleaning function to on and off, the automatic cleaning function causing the cleaning unit to automatically perform the cleaning of the in-vehicle sensor; and a notification unit configured to provide a notification about switching a setting of the automatic cleaning function, based on information on past cleaning of the in-vehicle sensor, when the automatic cleaning function is set to off by the setting unit.

With the in-vehicle sensor cleaning system and the like of the present disclosure, in a case where the automatic cleaning function of the in-vehicle sensor is set to off, a notification about switching the setting of the automatic cleaning function is provided, so that the usefulness etc. of the automatic cleaning function can be proposed to the vehicle user, and the vehicle user can be encouraged to switch the function to the on-setting.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a processing flowchart of cleaning performance information collection control;

FIG. 3A is a processing flowchart of automatic cleaning function setting control; and FIG. 3B is a processing flowchart of the automatic cleaning function setting control.

DETAILED DESCRIPTION OF EMBODIMENTS

Figure 1:
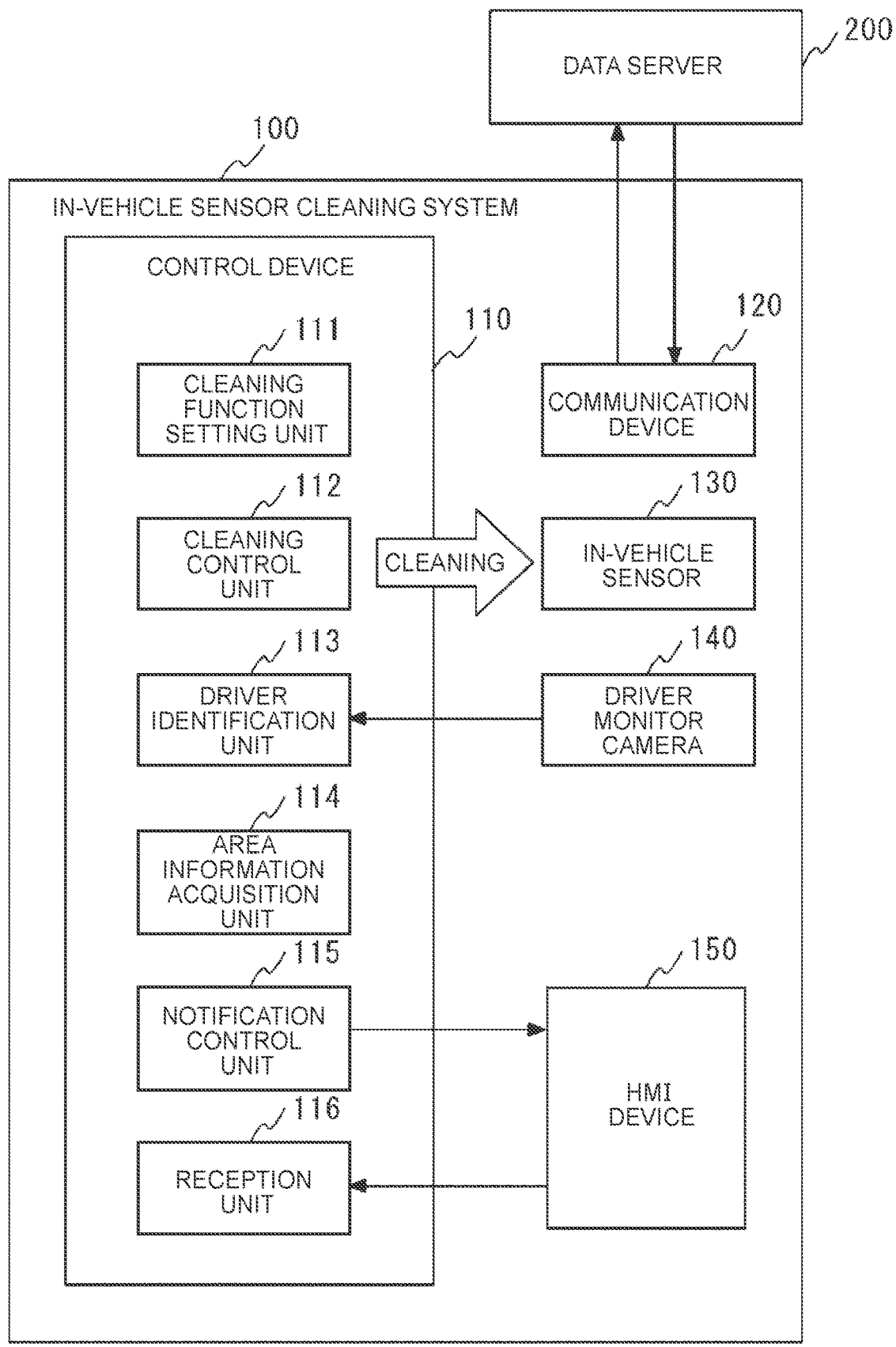
FIG. 1 is a schematic configuration diagram of an in-vehicle sensor cleaning system according to the present embodiment.

An in-vehicle sensor cleaning system installed in a vehicle of the present disclosure provides to a driver, when the automatic cleaning function of the in-vehicle sensor is set to off, a notification about switching a setting of an automatic cleaning function when determination is made that cleaning should be performed based on information on past cleaning of the in-vehicle sensor. This makes it possible to encourage a vehicle user to switch the automatic cleaning function to an on-setting.

Hereinafter, an embodiment of the present disclosure will be described in detail with reference to the drawings.

EMBODIMENT

Configuration

FIG. 1 is a schematic configuration diagram showing an in-vehicle sensor cleaning system 100 according to an embodiment of the present disclosure. The in-vehicle sensor cleaning system 100 illustrated in FIG. 1 includes a control device 110, a communication device 120, an in-vehicle sensor 130, a driver monitor camera 140, and a human-machine interface (HMI) device 150. The in-vehicle sensor cleaning system 100 is installed in a vehicle and is connected to a data server 200 so as to be able to communicate with the data server 200, the data server 200 being provided outside the vehicle.

The communication device 120 is a communication interface for connecting the in-vehicle sensor cleaning system 100 to the data server 200. The communication device 120 enables communication between the in-vehicle sensor cleaning system 100 and the data server 200 based on control of the control device 110. The communication device 120 of the present embodiment transmits (uploads) information to the data server 200. The information (performance information) is output from the control device 110 and is about cleaning that is currently being performed for the in-vehicle sensor 130. The communication device 120 also requests the data server 200 to transmit information (past information) on cleaning that has been performed in the past for the in-vehicle sensor 130. The communication device 120 then receives (downloads) the past information transmitted from the data server 200 in response to the request. The performance information and the past information communicated between the communication device 120 and the data server 200 will be described later.

The in-vehicle sensor 130 is a camera that captures images forward of the vehicle or a radar sensor that detects objects in front of the vehicle, the camera and the radar sensor being installed on a windshield or the like at the front part of the vehicle, or a camera that captures images rearward of the vehicle, the camera being installed on the trunk lid or tailgate at the rear part of the vehicle, for example.

In the vicinity of the in-vehicle sensor 130, a cleaning device (not shown) is provided to perform cleaning of the in-vehicle sensor 130 based on instructions from the control device 110. In the vicinity of the in-vehicle sensor 130, a detecting device (not shown) that detects dirt on the in-vehicle sensor 130 and informs the control device 110 thereof may be provided. The cleaning device and the detecting device may be integrated with the in-vehicle sensor 130 or may be configured separately from the in-vehicle sensor 130.

The driver monitor camera 140 is a camera, for example, installed on the windshield or the like at the front part of the vehicle to capture images of a driver that is an occupant seated in a driver's seat of the vehicle. The images, including the driver, captured by the driver monitor camera 140 are output to the control device 110.

The HMI device 150 is means capable of presenting a variety of information about the vehicle. Various devices (not shown) such as head-up displays (HUDs), navigation system monitors, instrument panels, and speakers are used as the HMI device 150. The HMI device 150 can present a variety of information to the vehicle user based on notifications, requests, etc. output from the control device 110. When there are instructions, operations, and the like by the vehicle user, the HMI device 150 can also output information in response to the instructions, operations, and the like to the control device 110. The HMI device 150 may be provided with voice guidance or voice recognition functions.

The data server 200 is a server for collecting a variety of information on a plurality of vehicles and for managing and controlling the vehicles using the collected information. The data server 200 can be, for example, a cloud server provided on the cloud. The data server 200 is connected directly or indirectly via a predetermined network or the like to the communication device 120 of the in-vehicle sensor cleaning system 100 so as to be able to communicate with the communication device 120.

The control device 110 controls an act of cleaning the in-vehicle sensor 130 either automatically or manually. In addition, the control device 110 notifies the vehicle user about switching the setting of the automatic cleaning function and receives permission (approval) from the vehicle user about switching the setting of the automatic cleaning function via the HMI device 150.

The control device 110 includes a cleaning function setting unit 111, a cleaning control unit 112, a driver identification unit 113, an area information acquisition unit 114, a notification control unit 115, and a reception unit 116.

The cleaning function setting unit 111 is configured to set and control an operation of the customizable in-vehicle sensor cleaning system 100 including at least an on/off setting of the automatic cleaning function through which the cleaning of the in-vehicle sensor 130 is automatically performed. Examples of other operations of the customizable in-vehicle sensor cleaning system 100 include a setting of displaying a manual cleaning performing button on a display screen of the HMI device 150, and a setting of notifying the vehicle user of cleaning timing through a speaker of the HMI device 150.

The cleaning control unit 112 is configured to control the act of automatic or manual cleaning of the in-vehicle sensor 130 based on content of the setting by the cleaning function setting unit 111. The cleaning control unit 112 instructs the cleaning device (not shown) that is an actuator, for example, to perform the cleaning of the in-vehicle sensor 130. In addition, the cleaning control unit 112 determines whether the cleaning is manually performed according to the operation of the vehicle user or the cleaning is automatically performed by the system, as information when controlling the cleaning. The information on automatic cleaning/manual cleaning is provided to the data server 200 via the communication device 120.

The driver identification unit 113 is configured to identify the driver who drives the vehicle. Specifically, the driver identification unit 113 acquires an image including the driver from the driver monitor camera 140 and identifies (specifies) the driver by, for example, analyzing the acquired image. The information used to identify (specify) the driver is stored in advance, for example, in a storage unit (not shown). The information on the driver identified is provided to the data server 200 via the communication device 120.

The area information acquisition unit 114 is configured to acquire information on the area in which the vehicle is traveling. Specifically, the area information acquisition unit 114 acquires, for example, as information on the area in which the vehicle is traveling, information on the traveling location (latitude and longitude, city/town/village classification, mesh of map data, etc.) and information on the traveling date and time (date, time, day of the week, etc.), information on traveling environment (weather, passing speed, etc.), and the like. The information can be acquired by a function of a global positioning system (GPS), a car navigation function, and a clock function, and the like that are installed in the vehicle. The acquired information on the traveling area is provided to the data server 200 via the communication device 120.

When the cleaning of the in-vehicle sensor 130 is performed, the notification control unit 115 causes the information on the automatic cleaning/manual cleaning determined by the cleaning control unit 112, the information on the driver identified by the driver identification unit 113, and the information on the traveling area acquired by the area information acquisition unit 114 to be provided to the data server 200 via the communication device 120, as the performance information on the cleaning currently being performed for the in-vehicle sensor 130. In addition, the notification control unit 115 acquires the past information on the cleaning that has been performed in the past for the in-vehicle sensor 130 from the data server 200, when ignition is turned on (IG-ON), for example. When the automatic cleaning function is set to off by the cleaning function setting unit 111, the notification control unit 115 makes determination about the acquired past information and provides the notification about switching of the setting of the automatic cleaning function to the HMI device 150. Determination about the past information will be described later.

The reception unit 116 receives the instructions, operations, and the like by the vehicle user that are input to the HMI device 150, from the HMI device 150. In the embodiment, the reception unit 116 can receive at least permission (approval) to switch the setting of the automatic cleaning function from off to on, from the HMI device 150. The cleaning function setting unit 111 is informed of content of the permission (approval) received by the reception unit 116.

A part or all of the control device 110 described above may typically be composed of an electronic control unit (ECU) such as a microcomputer or the like, including a processor, a memory, an input/output interface, and the like. The ECU (traveling control ECU and the like) constituting the control device 110 can realize some or all of the functions performed by the cleaning function setting unit 111, the cleaning control unit 112, the driver identification unit 113, the area information acquisition unit 114, the notification control unit 115, and the reception unit 116 described above when the processor reads and executes the program stored in the memory.

Control

Next, with reference to FIGS. 2, 3A, and 3B, the control executed by the in-vehicle sensor cleaning system 100 according to the present embodiment will be described. The control executed by the in-vehicle sensor cleaning system 100 includes cleaning performance information collection control and automatic cleaning function setting control.

(1) Cleaning Performance Information Collection Control

FIG. 2 is a processing flowchart of the cleaning performance information collection control executed by the in-vehicle sensor cleaning system 100. The cleaning performance information collection control is control in which information about the cleaning of the in-vehicle sensor 130 actually performed is collected and the information is uploaded to the data server 200. The process of the cleaning performance information collection control shown in FIG. 2 starts, for example, when cleaning control of the in-vehicle sensor 130 is performed by the cleaning control unit 112 of the control device 110.

Step S201

The cleaning control unit 112 of the control device 110 determines whether the cleaning control of the in-vehicle sensor 130 is automatic cleaning based on system control or is manual cleaning based on the operation of the vehicle user. When determination is made, by the cleaning control unit 112, as to whether the cleaning control is automatic cleaning or manual cleaning, the process proceeds to step S202.

Step S202

The driver identification unit 113 of the control device 110 identifies the driver seated in the driver's seat of the vehicle when the cleaning control of the in-vehicle sensor 130 is performed, based on an image acquired from the driver monitor camera 140. As a result, the individual driver driving the vehicle is specified. When the driver is identified by the driver identification unit 113, the process proceeds to step S203.

Step S203

The area information acquisition unit 114 of the control device 110 acquires the information on the area in which the vehicle is traveling when the cleaning control of the in-vehicle sensor 130 is performed. Examples of the information on the traveling area to be acquired include the traveling location of the vehicle (XX town), the traveling date and time (MM/DD, hh:mm), and the driving environment (rainy weather). When the information on the traveling area is acquired by the area information acquisition unit 114, the process proceeds to step S204.

Step S204

The notification control unit 115 of the control device 110 transmits and provides the information on automatic cleaning/manual cleaning (step S201), the information on the identified driver (step S202), and the information on the traveling area (step S203), as the performance information on the cleaning currently being performed for the in-vehicle sensor 130, to the data server 200 via the communication device 120. When each piece of information is provided to the data server 200 by the notification control unit 115, the cleaning performance information collection control ends.

As described above, a variety of information provided by the in-vehicle sensor cleaning system 100 is collected, stored, and managed by the data server 200, and the information is utilized not only in the vehicle that provided the information, but also in other vehicles.

(2) Automatic Cleaning Function Setting Control

FIGS. 3A and 3B are processing flowcharts of the automatic cleaning function setting control executed by the in-vehicle sensor cleaning system 100. The processes of FIG. 3A and the processes of FIG. 3B are connected by connectors X and Y. The automatic cleaning function setting control is a control in which a proposal is made to the vehicle user to set the automatic cleaning function to on in accordance with a predetermined condition, when the automatic cleaning function is set to off. The process of the automatic cleaning function setting control shown in FIGS. 3A and 3B starts, for example, when the ignition switch of the vehicle is turned on (IG-ON).

Step S301

The cleaning function setting unit 111 of the control device 110 determines a setting state of the automatic cleaning function through which the cleaning of the in-vehicle sensor 130 is automatically performed. This determination is made to determine whether the in-vehicle sensor 130 is likely to be left dirty without being cleaned for a long period of time.

When the cleaning function setting unit 111 determines that the automatic cleaning function is set to off (step S301: OFF), the process proceeds to step S302. On the other hand, when the cleaning function setting unit 111 determines that the automatic cleaning function is set to on (step S301: ON), the automatic cleaning function setting control ends.

Step S302

The control device 110 specifies the driver seated in the driver's seat of the vehicle and the area in which the vehicle is traveling. The driver can be specified by the information of identification performed based on the image acquired from the driver monitor camera 140 by the driver identification unit 113 of the control device 110. The traveling area of the vehicle can be specified by information acquired from the function of the GPS, for example, by the area information acquisition unit 114 of the control device 110. When the driver and the traveling area of the vehicle are specified by the control device 110, the process proceeds to step S303.

Step S303

The notification control unit 115 of the control device 110 acquires, with respect to the specified driver and the traveling area of the vehicle, the information (past information) about the cleaning that has been performed in the past for the in-vehicle sensor 130 from the data server 200 via the communication device 120. When the past information on the past cleaning is acquired from the data server 200 by the notification control unit 115, the process proceeds to step S304.

Step S304

The cleaning function setting unit 111 of the control device 110 determines whether the number of times of the act of cleaning that has been manually performed for the in-vehicle sensor 130 by the driver specified in step S302 (specified driver) in the past is equal to or greater than a first threshold value. This determination is made to estimate the dirt on the in-vehicle sensor 130. Thus, for example, when a parameter for the determination is time, a period of time from the current time to a time backward by a predetermined time can be the "past," and when the parameter for the determination is distance, the distance backward by a predetermined distance from the current travel distance (ODD value) can be the "past." The first threshold value can be set as appropriate depending on the length (a predetermined time, a predetermined distance) of the "past" with reference to whether the dirt on the in-vehicle sensor 130 is of a degree that needs to be cleaned (performing cleaning is desirable).

When the cleaning function setting unit 111 determines that the number of times of past cleaning manually performed by the specified driver is equal to or greater than the first threshold value (step S304: YES), the process proceeds to step S306. On the other hand, when the cleaning function setting unit 111 determines that the number of times of the past cleaning manually performed by the specified driver is less than the first threshold value (step S304: NO), the process proceeds to step S305.

Step S305

The cleaning function setting unit 111 of the control device 110 determines whether the number of times of the act of cleaning that has been automatically performed for the in-vehicle sensor 130 by the system in the traveling area of the vehicle specified in step S302 (specified traveling area) in the past is equal to or greater than a second threshold value. This determination is made to estimate the dirt on the in-vehicle sensor 130. Thus, for example, when the parameter for the determination is time, a period of time from the current time to a time backward by a predetermined time, or a particular period of time such as winter season in which there is snowfall and rainy season can be the "past." The second threshold value can be set as appropriate depending on the length (a predetermined time, winter season, rainy season) of the "past" with reference to whether the dirt on the in-vehicle sensor 130 is of a degree that needs to be cleaned (performing cleaning is desirable). Only an own vehicle in the specified traveling area may be the target of the number of times of the act of cleaning, or a plurality of vehicles including the own vehicle and other vehicles in the specified traveling area may be the target of the number of times of the act of cleaning. When a plurality of vehicles is the target, the number of times of the act of cleaning can be an average value, a maximum value, a minimum value, or the like of the plurality of vehicles.

When the cleaning function setting unit 111 determines that the number of times of past cleaning automatically performed by the system in the specified traveling area is equal to or greater than the second threshold value (step S305: YES), the process proceeds to step S306. On the other hand, when the cleaning function setting unit 111 determines that the number of times of the past cleaning automatically performed by the system in the specified traveling area is less than the second threshold value (step S305: NO), the automatic cleaning function setting control ends.

Step S306

The cleaning function setting unit 111 of the control device 110 determines whether a first time has elapsed since the automatic cleaning function was set to off. This determination is made to estimate how long the in-vehicle sensor 130 has not been cleaned. Therefore, the first time can be set as appropriate based on whether the in-vehicle sensor 130 may be dirty to the degree that the in-vehicle sensor 130 needs to be cleaned (cleaning is desirable).

When the cleaning function setting unit 111 determines that the first time has elapsed since the automatic cleaning function was set to off (step S306: YES), the process proceeds to step S307. On the other hand, when the cleaning function setting unit 111 determines that the first time has not yet elapsed since the automatic cleaning function was set to off (step S306: NO), the automatic cleaning function setting control ends.

Step S307

The notification control unit 115 of the control device 110 provides an explanation about the automatic cleaning function of the in-vehicle sensor 130 installed in the vehicle and the automatic cleaning function being in the off state, to the vehicle user via the HMI device 150. This explanation is provided for the purpose of first making the fact that the automatic cleaning function is installed in the vehicle or that the setting of the automatic cleaning function can be customized known to the vehicle user who is not aware thereof. The explanation may be provided only by text display, only by audio output, or both by text display and audio output. When the explanation about the automatic cleaning function of the in-vehicle sensor 130 and the setting thereof is provided by the notification control unit 115, the process proceeds to step S308.

Step S308

The notification control unit 115 of the control device 110 proposes to the vehicle user via the HMI device 150 to turn on the setting of the automatic cleaning function of the in-vehicle sensor 130. The purpose of step S308 is to go one step further to encourage the vehicle user to change the setting, considering that the vehicle user has understood about the automatic cleaning function and about the setting thereof through the explanation in step S307 above. When it is proposed by the notification control unit 115 to turn on the setting of the automatic cleaning function, the process proceeds to step S309.

Step S309

The reception unit 116 of the control device 110 determines, via the HMI device 150, whether permission (approval) to switch the setting of the automatic cleaning function from off to on is given, i.e., whether the vehicle user including the specified driver has given an explicit instruction to set the automatic cleaning function of the in-vehicle sensor 130 to on. This determination may be made after waiting for a predetermined time to elapse after the automatic cleaning function is proposed to be turned on in step S308 above.

When the reception unit 116 determines that there is an instruction to set the automatic cleaning function to on (step S309: Yes), the process proceeds to step S310. On the other hand, when the reception unit 116 determines that there is no instruction to set the automatic cleaning function to on (step S309: NO), the automatic cleaning function setting control ends.

Step S310

The cleaning function setting unit 111 of the control device 110 sets the automatic cleaning function of the in-vehicle sensor 130 to on. Thus, when the in-vehicle sensor 130 is dirty, the dirt is detected in the detecting device (not shown) so that the in-vehicle sensor 130 can be cleaned immediately. When the automatic cleaning function is set to on by the cleaning function setting unit 111, the automatic cleaning function setting control ends.

In the above flowchart of the automatic cleaning function setting control, determination is made about both the number of times of the past cleaning manually performed by the specified driver (step S304) and the number of times of the past cleaning automatically performed by the system in the specified traveling area (step S305); however, determination may be made about either thereof.

In the above flowchart of the automatic cleaning function setting control, the automatic cleaning function setting control ends when any of the following conditions are not satisfied: the number of times of the past cleaning manually performed by the specified driver (step S304); the number of times of the past cleaning automatically performed by the system in the specified traveling area (step S305); the time elapsed since the automatic cleaning function was set to off (step S306), and presence of the instruction to set the automatic cleaning function to on (step S309). However, when these conditions are not satisfied, the process may return to step S301, and the automatic cleaning function setting control may be repeated until the vehicle ignition is turned off (IG-OFF).

Operations and Effects

As described above, according to the in-vehicle sensor cleaning system 100 of the embodiment of the present disclosure, in a case where the automatic cleaning function through which the system automatically performs the cleaning of the in-vehicle sensor 130 installed in the vehicle is set to off, a notification about switching the setting of the automatic cleaning function is provided to the vehicle user such as the driver, when the dirt on the in-vehicle sensor 130 is estimated to be in a state where cleaning is desirable based on information on the past cleaning (the number of times of manual cleaning by the driver or the number of times of automatic cleaning in the traveling area) for the in-vehicle sensor 130.

This notification can propose the usefulness of the automatic cleaning function to the vehicle user and encourage the vehicle user to switch the function to the on-setting, even when the automatic cleaning function is set to off in a case where the vehicle user is not aware that the operation of the in-vehicle sensor cleaning system 100 can be customized, for example. Therefore, it can be expected that the performance of detecting/sensing by the in-vehicle sensor 130 can be maintained with high accuracy.

Although the embodiment of the present disclosure has been described above, the present disclosure can be applied to an in-vehicle sensor cleaning system, a method executed by an in-vehicle sensor cleaning system including a processor and a memory, a control program for executing the method, a computer-readable non-transitory storage medium that stores a control program, and a vehicle equipped with an in-vehicle sensor cleaning system.

The in-vehicle sensor cleaning system according to the present disclosure can be used for a vehicle equipped with an automatic cleaning device for an in-vehicle sensor, for example.

What is claimed is:

1. An in-vehicle sensor cleaning system installed in a vehicle, the in-vehicle sensor cleaning system comprising:
    a cleaning unit configured to automatically or manually perform cleaning of an in-vehicle sensor installed in the vehicle;
    a setting unit configured to set an automatic cleaning function to on and off, the automatic cleaning function causing the cleaning unit to automatically perform the cleaning of the in-vehicle sensor;
    a notification unit configured to provide a notification about switching a setting of the automatic cleaning function, based on information on past cleaning of the in-vehicle sensor, when the automatic cleaning function is set to off by the setting unit; and
    an acquisition unit configured to acquire the information on the past cleaning by another vehicle, wherein the notification unit provides the notification about switching the setting of the automatic cleaning function, based on the number of times of the past cleaning that has been automatically performed in the predetermined traveling area by the other vehicle, the number of times of the past cleaning being acquired by the acquisition unit.

2. The in-vehicle sensor cleaning system according to claim 1, wherein the information on the past cleaning is the number of times of the past cleaning of the in-vehicle sensor performed manually.

3. The in-vehicle sensor cleaning system according to claim 2, further comprising an identification unit configured to identify a driver of the vehicle, wherein the notification unit provides the notification about switching the setting of the automatic cleaning function to the driver, based on the number of times of the past cleaning that has been manually performed by the driver identified by the identification unit.

4. The in-vehicle sensor cleaning system according to claim 2, wherein the number of times of the past cleaning is the number of times of the cleaning performed within a predetermined period of time or the number of times of the cleaning performed while traveling a predetermined distance.

5. The in-vehicle sensor cleaning system according to claim 2, wherein the notification unit provides the notification about switching the setting of the automatic cleaning function to a driver of the vehicle when the number of times of the past cleaning is equal to or greater than a first threshold value.

6. The in-vehicle sensor cleaning system according to claim 1, wherein the information on the past cleaning is the number of times of the past cleaning of the in-vehicle sensor performed automatically in a predetermined traveling area.

7. The in-vehicle sensor cleaning system according to claim 6, wherein the number of times of the past cleaning is the number of times of the cleaning performed within a predetermined period of time.

8. The in-vehicle sensor cleaning system according to claim 6, wherein the notification unit provides the notification about switching the setting of the automatic cleaning function to a driver of the vehicle when the number of times of the past cleaning is equal to or greater than a second threshold value.

9. The in-vehicle sensor cleaning system according to claim 1, wherein the notification unit provides the notification about switching the setting of the automatic cleaning function after a first time elapses after the setting of the automatic cleaning function is switched from on to off by the setting unit.

10. The in-vehicle sensor cleaning system according to claim 1, wherein the notification about switching the setting of the automatic cleaning function is a notification proposing to a driver of the vehicle to switch the setting of the automatic cleaning function from off to on.

11. The in-vehicle sensor cleaning system according to claim 1, wherein the notification unit provides the notification about switching the setting of the automatic cleaning function by sound.

12. The in-vehicle sensor cleaning system according to claim 1, further comprising a reception unit configured to receive an instruction from a driver of the vehicle to switch the automatic cleaning function from off to on.

13. The in-vehicle sensor cleaning system according to claim 12, wherein the setting unit sets the automatic cleaning function to on when the reception unit receives the instruction from the driver of the vehicle to switch the automatic cleaning function from off to on.

14. A method that is executed by a computer of a cleaning system including a cleaning unit configured to automatically or manually perform cleaning of an in-vehicle sensor installed in a vehicle, the method comprising:
- a step of determining an on-off setting state of an automatic cleaning function that causes the cleaning unit to automatically perform the cleaning of the in-vehicle sensor;
- a step of providing a notification about switching a setting of the automatic cleaning function, based on information on past cleaning of the in-vehicle sensor, when the automatic cleaning function is set to off; and
- a step of acquiring the information on the past cleaning by another vehicle, wherein the notification about switching the setting of the automatic cleaning function, is based on the number of times of the past cleaning that has been automatically performed in the predetermined traveling area by the other vehicle, the number of times of the past cleaning.

15. A non-transitory storage medium storing a program that is executed by a computer of a cleaning system including a cleaning unit configured to automatically or manually perform cleaning of an in-vehicle sensor installed in a vehicle, the program comprising:
- a step of determining an on-off setting state of an automatic cleaning function that causes the cleaning unit to automatically perform the cleaning of the in-vehicle sensor;
- a step of providing a notification about switching a setting of the automatic cleaning function, based on information on past cleaning of the in-vehicle sensor, when the automatic cleaning function is set to off; and
- a step of acquiring the information on the past cleaning by another vehicle, wherein the notification about switching the setting of the automatic cleaning function, is based on the number of times of the past cleaning that has been automatically performed in the predetermined traveling area by the other vehicle, the number of times of the past cleaning.

* * * * *